(No Model.) 2 Sheets—Sheet 1.

J. H. DIGEON.
HYDROSTATIC SCALE.

No. 515,753. Patented Mar. 6, 1894.

Fig. 1ª

Inventor:
Jules Henri Digeon

By Richards
his Attorneys.

Witnesses (No Model.) 2 Sheets—Sheet 2.
J. H. DIGEON.
HYDROSTATIC SCALE.
No. 515,753. Patented Mar. 6, 1894.
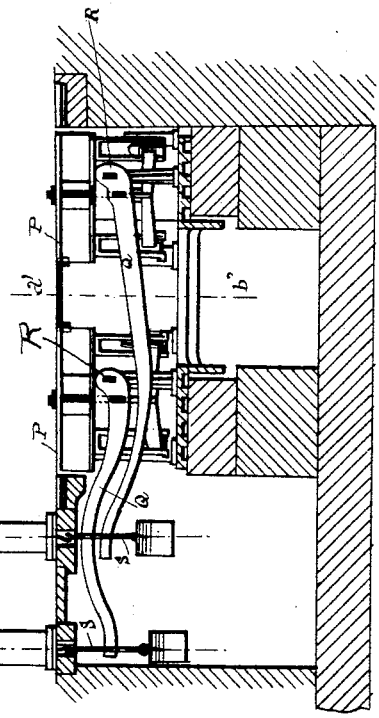
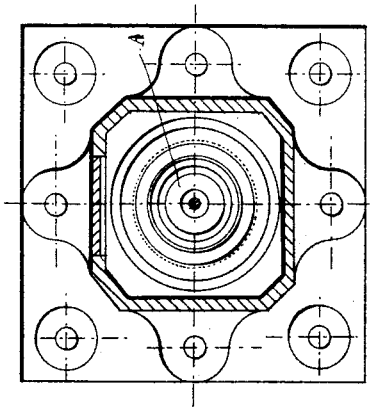
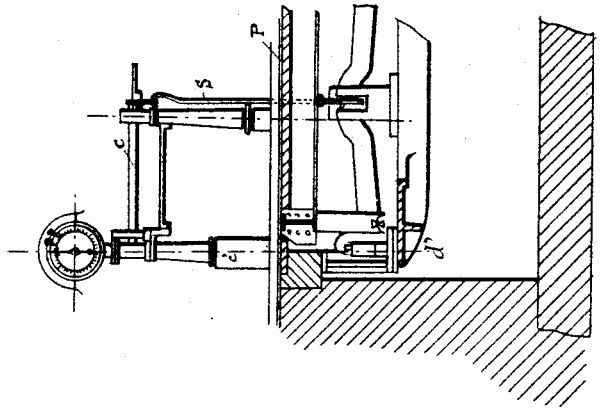
Witnesses:
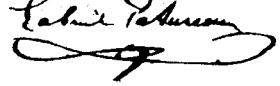
Inventor:
Jules Henri Digeon
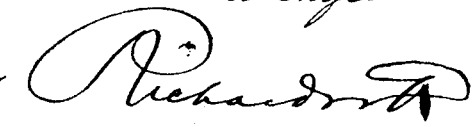
his Attorneys.

UNITED STATES PATENT OFFICE.

JULES HENRI DIGEON, OF PARIS, FRANCE.

HYDROSTATIC SCALE.

SPECIFICATION forming part of Letters Patent No. 515,753, dated March 6, 1894.

Application filed April 27, 1893. Serial No. 472,104. (No model.) Patented in France March 4, 1893, No. 228,384.

*To all whom it may concern:*

Be it known that I, JULES HENRI DIGEON, a citizen of the French Republic, residing at Paris, France, have invented certain new and useful Improvements in Hydrostatic Scales, (for which Letters Patent of France, No. 228,384, of March 4, 1893, have been secured,) of which the following is a specification.

It is the object of my invention to provide a hydrostatic weighing and indicating apparatus in which the measurements will be obtained by the displacement of a body immersed in a quantity of liquid, the said body being connected with an index finger moving over a suitable dial or other suitable indicating device whereby the amount of displacement will be shown and thus the weight indicated. By the use of the immersed body I dispense with all springs, and all adjustable counterbalancing weights are likewise done away with, and the immersed body will vary in its position in the liquid according to the variations in the weight of the bodies to be weighed, and thus its force tending to counterbalance the weighing body will vary inversely according to its degree of immersion, that is to say the heavier the body being weighed the more the immersed body will emerge from the liquid and consequently its force will increase so as to counterbalance the weighing body and thus place the parts in equilibrium, while on the other hand the lighter the weighing body the less the counter weight will be drawn up or out from the liquid and the quicker will the equilibrium of the parts be secured, and thus the indicating mechanism will be moved less than in the former case to indicate a lighter weight.

Figure 1:
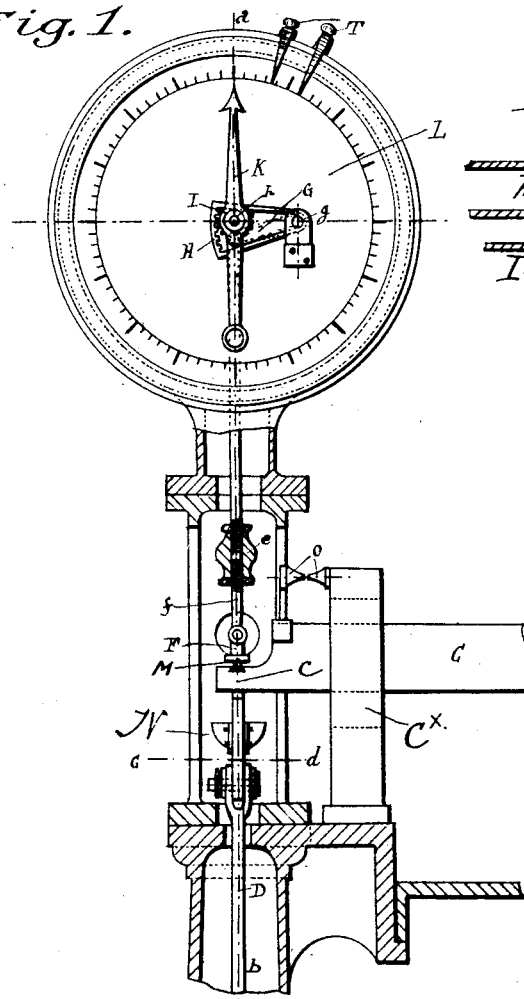
Figure 2:
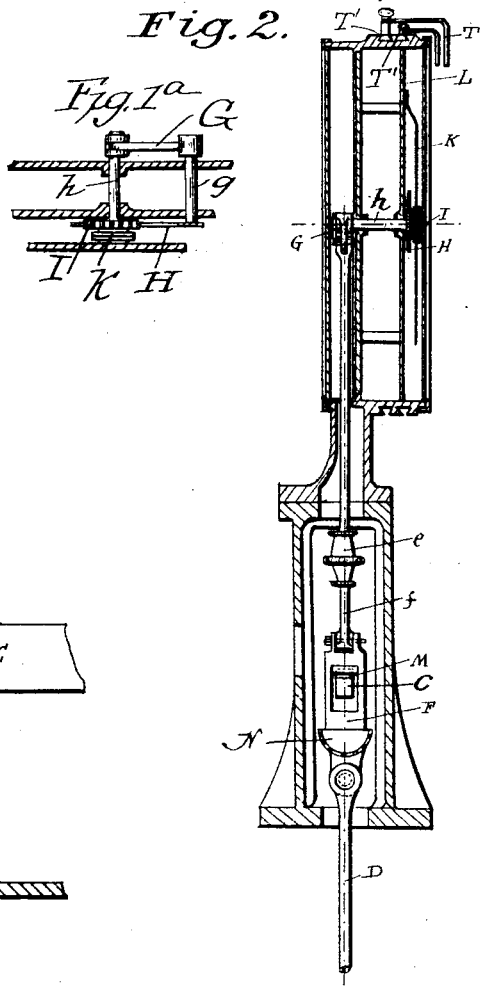
Figure 3:
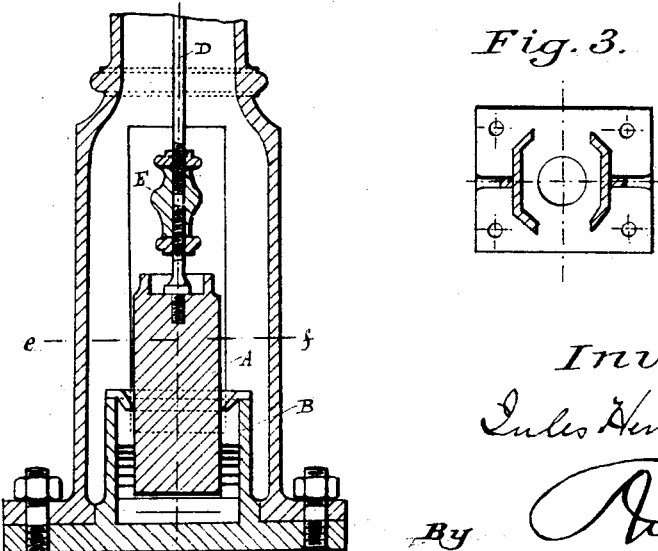

In the drawings:—Figure 1, is a sectional side elevation of the invention with only a portion of the balancing lever. Fig. 1ª is a detail view of the train of operating connections for moving the index finger. Fig. 2, is a sectional view on line $a-b$, Fig. 1. Fig. 3, is a sectional plan view on line $c-d$ of Fig. 1. Fig. 4, is a sectional plan view on line $e-f$ of Fig. 1. Fig. 5, represents the apparatus of Fig. 1, in side elevation and also a partial section on line $a'-b'$ of Fig. 6, showing the balancing lever connected with the weighing mechanism. Fig. 6, shows a part elevation and section of a double form of apparatus.

A weight A, immersed in a cistern B filled with non-volatile and uncongealable liquid (an aqueous solution of chloride of calcium, mercury, glycerine, &c.) is suspended at the extremity $c$ of the balance lever C by means of a rod D the length of which can be regulated at pleasure by the use of the turn buckle E. The rod D is continued at its upper part by a rod F that transmits the vertical displacement of the weight to the indicating mechanism. The rod F is suspended at the extremity of the lever C and the rod D is fixed to the same.

The indicating mechanism consists of a needle K indicating the weight upon a dial plate L. This needle is actuated by means of a rod $f$ connected with the lever G fixed upon the axle $g$ upon which is also fixed the toothed sector H, that actuates the pinion I fixed upon the axle $h$ and it is upon the axle $h$ that the needle K is fixed.

The rod F has a perforated upper end which rests upon the lever C, by the intermediary of a knife edge M, so as to keep its vertical position, and as a consequence that of D, whatever position the lever C may assume. A turn buckle $e$ renders it possible to regulate the length of the rod $f$ and consequently the position of the needle K.

Instead of suspending the weight rod D by means of the knife edge M in order to maintain the vertical position of the rod without regard to the position of the lever C I may form a sector on the end of the lever C, the curve of which is struck from the pivot point of the lever C as a center and the upper part of this sector will be connected by a band or cord with the upper end of the rod D.

A cup N into which lead is placed renders it possible to properly counterbalance the parts to secure the normal equilibrium. The index O which consists of the two tongues on the lever C and post C<sup>×</sup> serves to verify the equilibrium of the weighing machine before commencing to weigh; they serve also to determine whether or not the index is at the zero point when the apparatus is in normal position of rest. By bringing them directly opposite each other and counterbalancing the parts so that they will remain so the scale is perfectly set with the index at zero.

This instrument is particularly useful in distributing the weight of a locomotive or car upon the several wheels. This is essential in order to secure the perfect running of the car and to prevent undue injury to the tracks. It is often necessary to verify the distribution of the weight among the several wheels and to re-establish the same when found uneven. When the wheels of the locomotive have been carried upon the scale there being one for each wheel, each scale indicates a certain weight by means of the needle upon the graduated dial. Then one of the indexes T is placed in front of the needle to serve as point of reference to show better at a distance the position of the needle under the initial weight at the beginning of the operation. The second index is placed in front of the graduation that indicates the weight it is desired to obtain upon the corresponding wheel. For example the weight indicated upon the dial for a wheel when the locomotive is carried upon the scale is five hundred kilograms. I place an indicator in front of 500$^K$ to indicate the initial weight and when I want the wheel to carry one thousand kilograms, I place the other index in front of 1000$^K$ and at a distance I will see the needle reaching in front of 1000$^K$. Each wheel of a locomotive supports a certain weight through the intermediary of the suspension springs, and depending upon the relative tension of the various springs the locomotive will bear more or less upon any given wheel. What must be established is the exact weight upon each wheel and thus upon each axle and this is done by adjusting the spring bolts to vary the tension of the springs. By means of the several scales and their indexes T it is easy to judge at a distance how much the nuts of the spring rods must be tightened or loosened to obtain the desired weight upon each wheel.

The index tongues T are perfectly free to be adjusted to any point about the dial in relation to each other for which purpose their shanks are bent over the top of the dial box as shown in Fig. 2, and have ends arranged to slide in dove tailed grooves T'.

In Fig. 6, I show two platforms P, P each connected with an indicating apparatus such as is shown in Fig. 1, by the levers Q and rods S. This apparatus is especially adapted for weighing cars, locomotives and the like, there being a separate platform P and scale for each wheel only two of which are shown.

Referring to Figs. 1, 5 and 6; the needle A being at zero and the index tongues $o$ being in juxtaposition, if we put a locomotive or other body upon the weighing apparatus, each wheel standing upon a platform P the levers Q pivoted at R will transmit the weight to the rod S by being pressed down. The rod S will transmit the same to the lever C and thus will cause the rod D and consequently the mass A to rise, the relative weight of which will increase so as to counterbalance the weight placed upon the platform P. At the same time of the rising of the weight A, the rod F will act upon the needle K to indicate the weight of the locomotive or other body upon the dial plate L.

I claim—

1. In combination, the indicating mechanism comprising the dial and index finger, the pinion on the index, the segment H, the shaft $g$, for the same, the arm G on the shaft, the lever C connected to the arm, and the immersed body A connected to the lever C, substantially as described.

2. In a weighing apparatus, the combination of the lever C, the immersed body A connected thereto, the indicating mechanism comprising the dial and index and the two index fingers T, T, extending to the graduations on the dial, said index fingers being free to be adjusted about the dial in relation to each other and to the main index substantially as described.

In witness whereof I have hereunto set my hand in presence of two witnesses.

JULES HENRI DIGEON.

Witnesses:
 EMILE VILLON,
 GABRIEL PATEUSE.